G. ZUBER.
WATER HEATER.
APPLICATION FILED JUNE 17, 1912.
1,098,544.
Patented June 2, 1914.
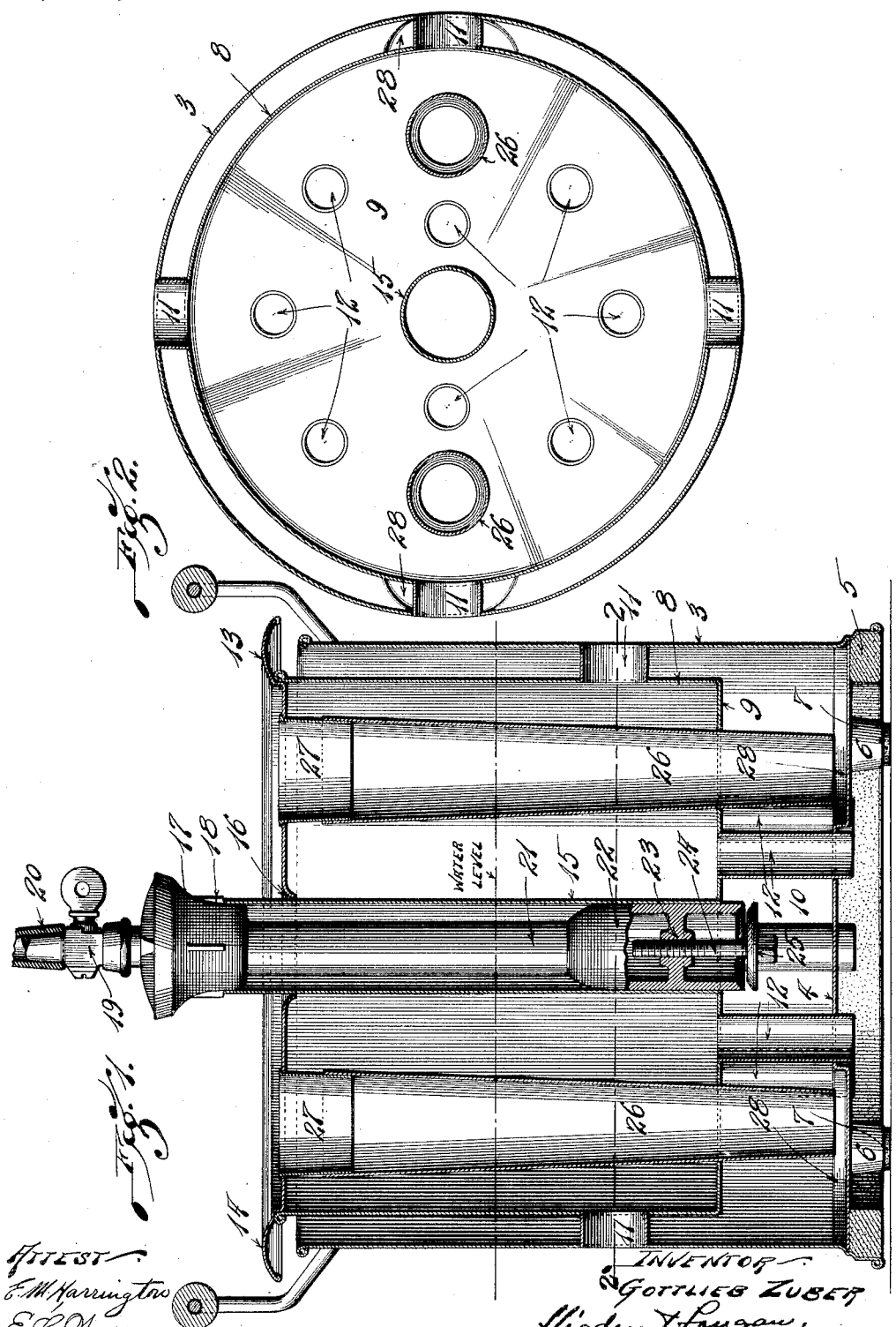

UNITED STATES PATENT OFFICE.

GOTTLIEB ZUBER, OF ST. LOUIS, MISSOURI, ASSIGNOR OF ONE-HALF TO HERMAN G. ZUBER, OF MURPHYSBORO, ILLINOIS.

WATER-HEATER.

1,098,544. Specification of Letters Patent. Patented June 2, 1914.

Application filed June 17, 1912. Serial No. 704,123.

*To all whom it may concern:*

Be it known that I, GOTTLIEB ZUBER, a citizen of the United States, and resident of St. Louis, Missouri, have invented certain new and useful Improvements in Water-Heaters, of which the following is a specification containing a full, clear, and exact description, reference being had to the accompanying drawings, forming a part hereof.

My invention relates to improvements in water heaters, and particularly relates to that class of water heaters which is to be submerged and has a combustion chamber beneath the surface of the body of water to be heated.

The object of my invention is to construct a water heater provided with a combustion chamber arranged to be submerged beneath the surface of the body of water to be heated, and to provide means for connecting said submerged combustion chamber with a source of heating medium.

With the above purposes in view my invention consists in certain novel features of construction and arrangement of parts as will be hereinafter more fully described, pointed out in the claim and illustrated by the accompanying drawings, in which—

Figure 1 is a vertical sectional elevation of a water heater constructed according to my invention; and Fig. 2 is a sectional plan of the water heater taken on the line 2—2 of Fig. 1, the burner being removed.

Referring by numerals to the accompanying drawings: 3 designates the outer cylindrical body portion and 4 the bottom of the outer cylindrical portion. Within the cylinder 3 and beneath the bottom 4 there is a ring 5. This ring has considerable body and its sole function is to provide a weight to overcome the buoyancy of the water heater. Projecting downwardly from the bottom 4 are the feet 6, the extremities of which are cushioned at 7 in order that, when the heater is placed to rest upon the bottom of a vessel holding a body of water to be heated, the surface of the bottom of the vessel will not be marred.

It is to be particularly noted that the feet 6 project below the bottom of the ring 5 and the lower end of the cylinder 3 as required to permit a water circulation from the body of water heated beneath the bottom 4 of the cylinder 3.

8 designates the inner cylinder having a bottom 9, the bottom 9 being spaced a considerable distance apart from the bottom 4 of the outer cylinder in order to provide a combustion chamber 10. The wall of the cylinder 8 and the wall of the cylinder 3 are spaced a considerable distance apart in order to permit the escape of the products of combustion from the chamber 10.

At intervals throughout the circumference of the heater, I have arranged the horizontal water circulating tubes 11 which are supported by the walls of the inner cylinder 8 and outer cylinder 3.

Supported by the bottoms 9 and 4 is a number of vertical water circulating tubes 12. The tubes 12 have water-tight connections with the bottoms 9 and 4 and permit of a circulation of water from the body of water to be heated into the inner cylinder 8, and the horizontal tubes permit a circulation of water from the interior of the cylinder 8 to the body of water being heated.

The wall of the inner cylinder projects slightly above the wall of the outer cylinder. Supported on top of the wall of the inner cylinder is a cover 13 having at its margin an annular extension beyond the wall of the inner cylinder forming a deflector 14 which overlies the top of the wall of the outer cylinder to cause the products of combustion rising between the walls of the inner and outer cylinder to discharge downwardly against the surface of the body of water to be heated.

15 designates an open-ended tube which is secured at its bottom end to the bottom 9 of the inner cylinder, the bottom end of the tube opening into the combustion chamber 10.

The tube 15 projects a slight distance above the cover 13 and, in order to provide for the fitting of the cover upon the top of the inner cylinder, there is an opening 16 formed in the cover through which the tube 15 projects.

17 designates an open-topped air mixer provided with radially extended lugs 18 which rest upon the upper end of the tube 15 forming a support for the mixer.

Secured to the mixer is a gas valve 19 provided with a means whereby a flexible tube 20 may be secured thereto. Secured to the mixer is a tube 21 to the lower end of which is secured the burner 22, the lower end of the burner being projected slightly into the combustion chamber 10.

Supported within the body of the burner is a threaded sleeve 23 into which is secured a threaded rod 24 carrying at its lower end a disk 25, the margin of which is beveled, the bevel inclining downwardly and outwardly so that the heat from the burner will be deflected to discharge against the vertical water circulating tubes 12.

26 designates tubes which are supported by the bottom 9 of the inner cylinder. These tubes project at their lower ends to points approximately in the plane of the body portion of the bottom 4, the upper ends of the tubes extending to points above the water level.

27 designates short tubes which are carried by the cover 13 and are arranged to be inserted in the tops of the tubes 26.

The bottom 4 of the outer cylinder is provided with depressions 28 surrounding the lowermost ends of the tubes 26. The tubes 26 and short tubes 27 provide a means for admitting air to the combustion chamber.

In the practical operation of the heater, a quantity of water is placed in a vessel and the heater is placed in the body of water. The burner is then placed in the tube 15 and the gas issuing from the valve 19 is ignited, the flame therefrom discharging from the open-ended bottom of the burner is deflected by the disk 25. This deflection of the flame and heat from the burner causes the heat to be discharged directly against the tubes 12, and from thence the heat travels between the bottoms 4 and 9 and between the vertical walls of the cylinders 3 and 8.

It is to be observed that the heat is conducted over a considerable area of heating surface.

After the heat has been discharged from the heater proper the deflector 14 causes the heat to be conducted against the surface of the body of water outside of the heater. In this manner the heat is utilized to obtain the greatest heating efficiency.

I claim:

A portable, submerged water heater, comprising inner and outer bodies which are spaced apart at their bottoms and sides, means for supporting the outer body in a plane above a supporting surface, open-ended water tubes connecting the bottoms of the inner and outer bodies, open-ended water tubes connecting the sides of the inner and outer bodies, an open-ended tube extended from the bottom of the inner body upwardly through the heater, a burner arranged to be located in said last mentioned tube to discharge into the space between the bottoms of the inner and outer bodies, air-supplying tubes secured to the bottom of the inner body and projecting above and below said bottom, a cover supported by the walls of the inner body, and open-ended tubes carired by said cover arranged to telescopically connect with said air-supplying tubes.

In testimony whereof, I have signed my name to this specification, in presence of two subscribing witnesses.

GOTTLIEB ZUBER.

Witnesses:
 E. L. WALLACE,
 N. G. BUTLER.

Copies of this patent may be obtained for five cents each, by addressing the "Commissioner of Patents, Washington, D. C."